United States Patent [19]
Iwasaki et al.

[11] Patent Number: 5,748,590
[45] Date of Patent: May 5, 1998

[54] APPARATUS FOR INSPECTING DISC RECORDING MEDIUM

[75] Inventors: Yasuo Iwasaki; Toshiaki Ozaki; Hiroyuki Miyawaki, all of Kanagawa, Japan

[73] Assignee: Sony Corporation, Tokyo, Japan

[21] Appl. No.: 696,509

[22] Filed: Aug. 14, 1996

[30] Foreign Application Priority Data

Aug. 18, 1995 [JP] Japan ................................ 7-233525

[51] Int. Cl.⁶ .................................................. G11B 7/00
[52] U.S. Cl. ............................ 369/58; 369/47; 369/59
[58] Field of Search .............................. 369/42, 48, 49, 369/50, 54, 58, 59, 32

[56] References Cited

U.S. PATENT DOCUMENTS

5,442,614  8/1995  Tanegai .......................................... 369/58

*Primary Examiner*—Muhammad N. Edun
*Attorney, Agent, or Firm*—Limbach & Limbach, L.L.P.

[57] ABSTRACT

An apparatus for inspecting a disc recording medium detects whether the high-frequency signals have been missed or not by the high-frequency-signal drop-out detecting circuit (26), in addition to the verification of the reproduced data and the detection of servo error of large instant change. Therefore, defect sectors of which sure detection have been heretofore difficult is detected with high efficiency, so as to prevent errors of the reproduced data.

5 Claims, 6 Drawing Sheets

FIG. 4A  REPRODUCED DATA

FIG. 4B  REPRODUCED RF SIGNAL

FIG. 4C  D.O. SIGNAL

FIG. 4D  TIMING SIGNAL

FIG. 4E  LATCH CIRCUIT OUTPUT SIGNAL

APPARATUS FOR INSPECTING DISC RECORDING MEDIUM

BACKGROUND OF THE INVENTION

1. Field of the Invention

This invention relates to a disc inspecting device for inspecting a disc recording medium if it has a defect, and more particularly, is applicable to a magneto-optical disc recording/reproducing device.

2. Description of the Related Art

Heretofore, in a magneto-optical disc which is used within a magneto-optical disc recording/reproducing device, physical defects is generated at the time of manufacturing, commonly. Due to these physical defects, there are areas from which data are not correctly reproduced even though the data have been recorded. Therefore, a magneto-optical disc is necessarily inspected to see if there is any defect sector in it, after it has been manufactured.

In this inspection, data are recorded on and reproduced from all areas of the magneto-optical disc. As to an area which has not been correctly recorded on and reproduced from, the area is called a defect sector, and the track number and the sector number of the defect sector are recorded on the defect management area in the magneto-optical disc.

In record and reproduction using the magneto-optical disc in which the defect sector is recorded, the magneto-optical disc recording/reproducing device performs recording and reproducing, with the avoidance of defect sectors which have been previously registered in the defect management area.

In this way, the magneto-optical disc recording/reproducing device operates well outwardly, as if no defect has generated on the magneto-optical disc. In addition, the magneto-optical disc recording/reproducing device similarly processes the defect sectors which have been generated during the magneto-optical disc is actually used, to prevent occurring of data errors due to the use of the defect sectors.

As the sources of defects which are generated during manufacturing, defects of a stamper, faults at the time of manufacturing of the substrate and the time of painting of the recording material, defective index of refraction of the substrate, degradation of the substrate, degradation of the recording material, flaws which have generated during manufacturing, etc. are considered. In order to detect surely the defective sectors due to these various defects directly after manufacturing, the conditions for recording and reproducing which are set at the time of inspection of direct after manufacturing are set to the value that data errors due to the defect are generated easier compared to the usual conditions of the time when a user employs it actually. For instance, the laser power of the time of recording and reproducing is deviated from the optimum point to write and read with a low power, and the correcting ability of an error correcting circuit (ECC) is set to become lower than the level which is employed by a user.

However, recently, as the size of the recording pit is diminished for improvement of the recording density (the recording line density), fine defects, flaws, etc. on a magneto-optical disc which have never become a problem has a relatively great influence on the data recording and reproducing.

Therefore, with the conventional detecting conditions such that the laser power is deviated from the optimum point to set the correcting ability of the ECC low, it has become hard to judge whether the data which have been recorded on a high-density recording magneto-optical disc have been correctly reproduced or not, and to detect defect sectors with high efficiency. Accordingly, with only registration of defect sectors which have been detected by the conventional method, it has become hard to sufficiently ensure the reliability of the inspected magneto-optical disc.

Figures 3A, 3B:
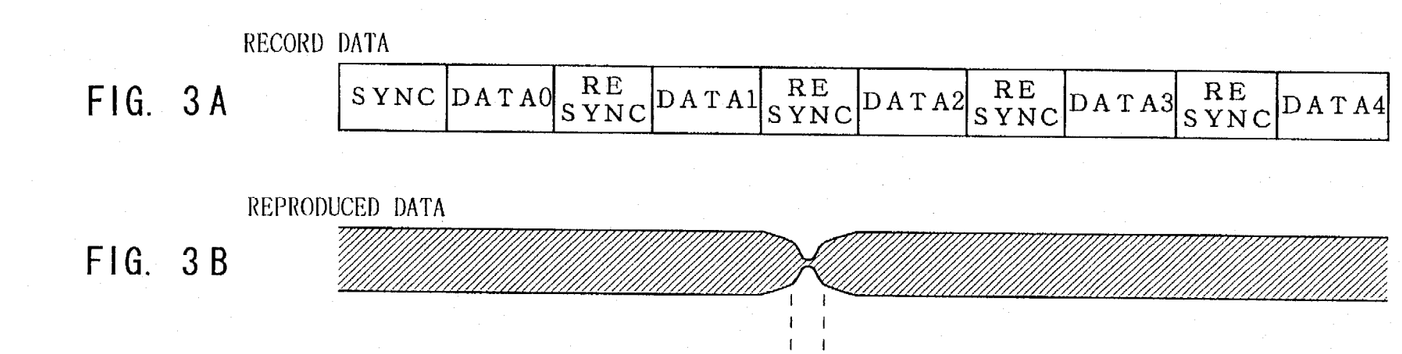
FIGS. 3A to 3C are schematic diagrams showing examples of recording data positions and drop-out of the reproduced high-frequency signal which is corresponding to the positions.
Figure 3C:
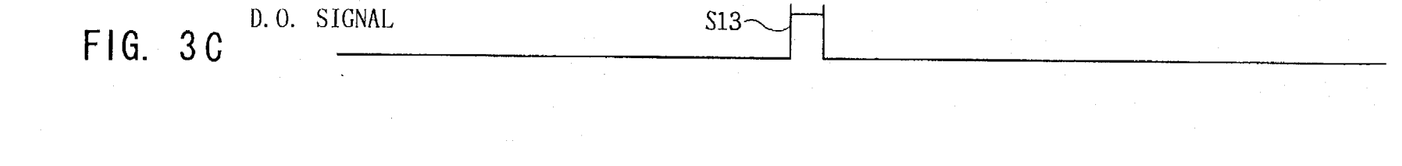
Figure 4A:
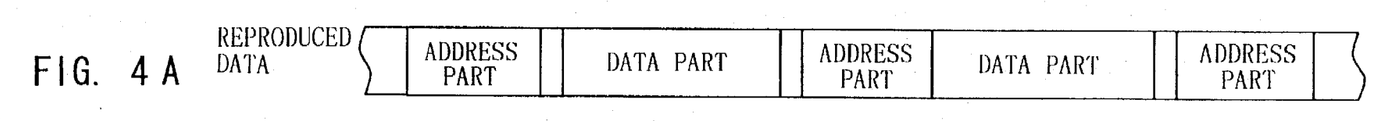
FIGS. 4A to 4E are timing charts showing a latch circuit output signal which is corresponding to the reproduced high-frequency signal.
Figure 4B:
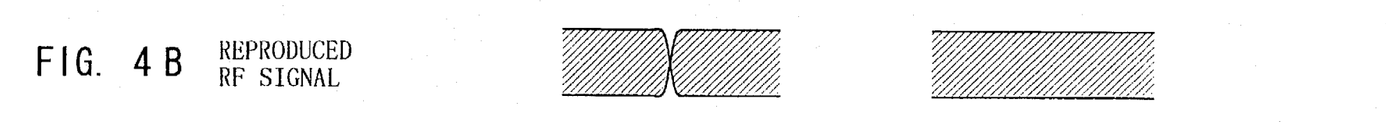
Figure 4C:
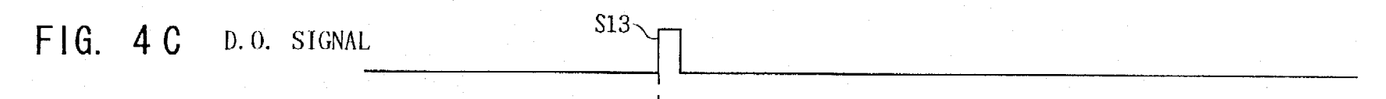
Figure 4D:
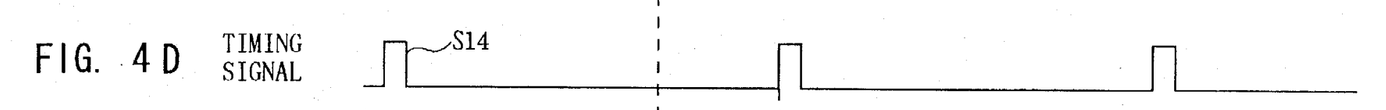
Figure 4E:
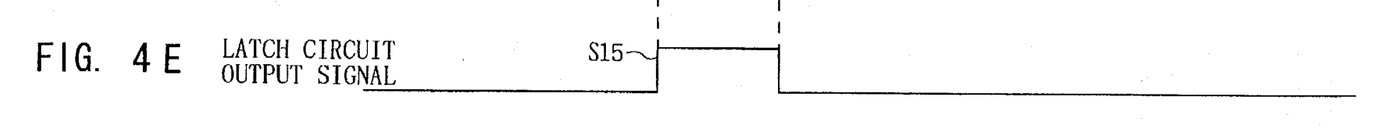

That is, even the case where the correcting ability of the ECC has been set lower at the time of inspection, a drop-out of a high-frequency signal which has occurred, e.g. at a portion corresponding to a resynchronizing signal (shown as RESYNC, in a figure) in the record data shown in FIGS. 3A to 3C (the drop-out period is so shorter than a conventional one. In FIGS. 3A to 3C, the drop-out period is shown exaggeratedly.) has been not detected as a defect and not registered.

The data area sector which has not been registered as a defect sector may cause a data error, owing to jitters of the record timing, irregularity of the amplitude of the reproduced high-frequency signal, etc.

Thus, a defect of the reproduced high-frequency signal has a relatively great influence on insurance of the reliability. Therefore, it is conceived, for instance, to repeat the inspection plural times with the conventional conditions, so as to ensure the precision of the result of the detection. However, there has been such a disadvantage that the manufacturing time is so increased as to raise the manufacturing cost.

SUMMARY OF THE INVENTION

In view of the foregoing, an object of this invention is to provide a disc inspecting device with a shorter duration for inspecting a high recording density disc recording medium, and which can improve the reliability of the data reproduced from the verified disc recording medium.

The foregoing object and other objects of the invention have been achieved by the provision of a disc inspecting device for inspecting a disc recording medium whether or not it has a defect, which has means for recording and reproducing data in a disc recording medium, servo means for servo-controlling the recording and reproducing means to record data in the disc recording medium in a predetermined state, and data reproducing means for reproducing data from the output of the reproducing means. The disc inspecting device comprises: data error detecting means for detecting error of data reproduced by the disc recording medium; servo error detecting means for detecting the existence of the instant change larger than the reference value of the servo error of the servo means; signal drop-out detecting means for detecting the drop-out of high-frequency signal reproduced from the disc recording medium; defect detecting means for detecting the existence of the defect of the disc recording medium based on the detected result of the data error detecting means, the servo error detecting means, and the signal drop-out detecting means; and recording means for recording the defect portion of the disc recording medium in the management area of the disc recording medium in accordance with the detected result of the defect detecting means.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
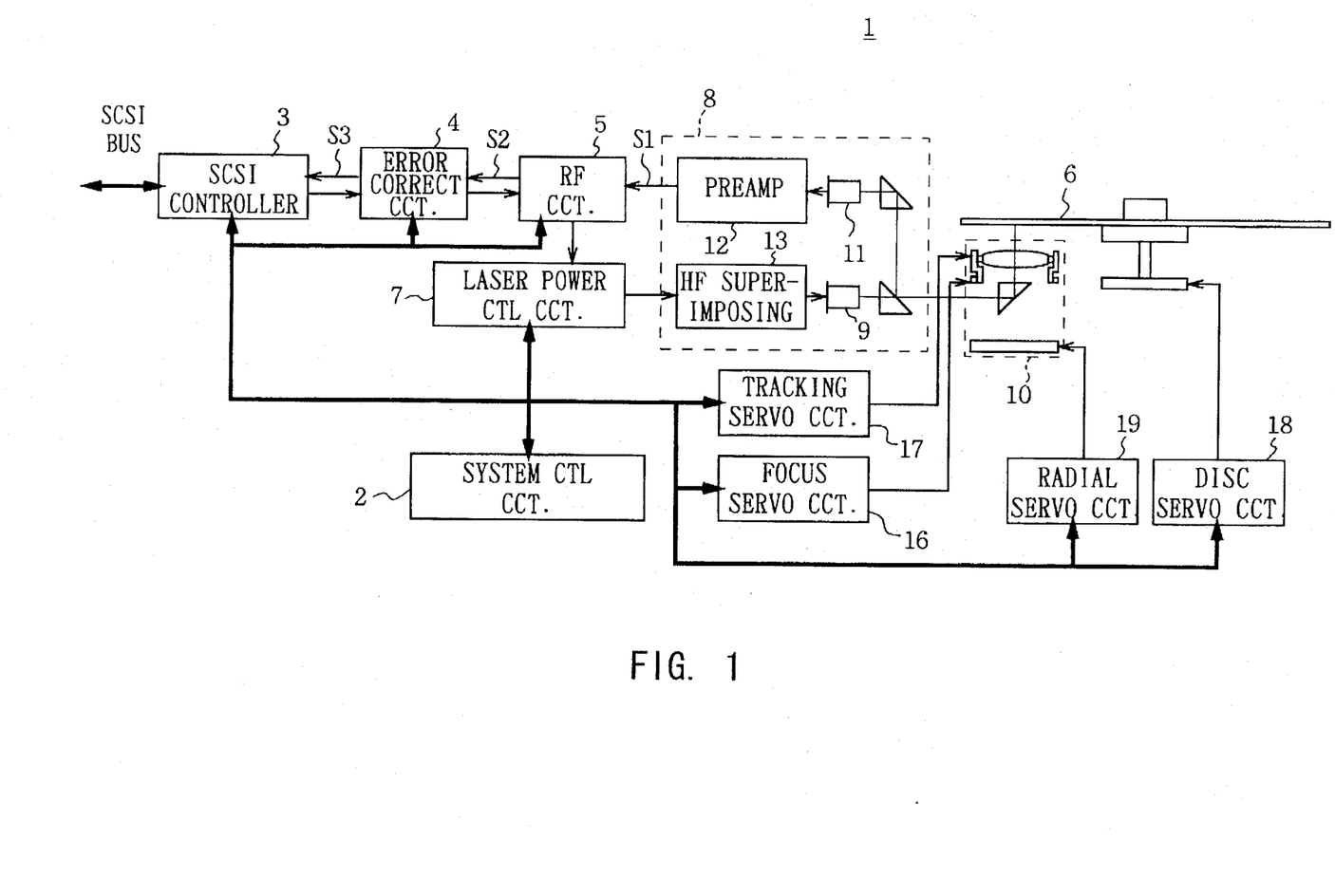
FIG. 1 is a configuration diagram illustrating the recording/reproducing system of the magneto-optical disc recording/reproducing device of an embodiment of the disc inspecting device according to the present invention.
Figure 2:
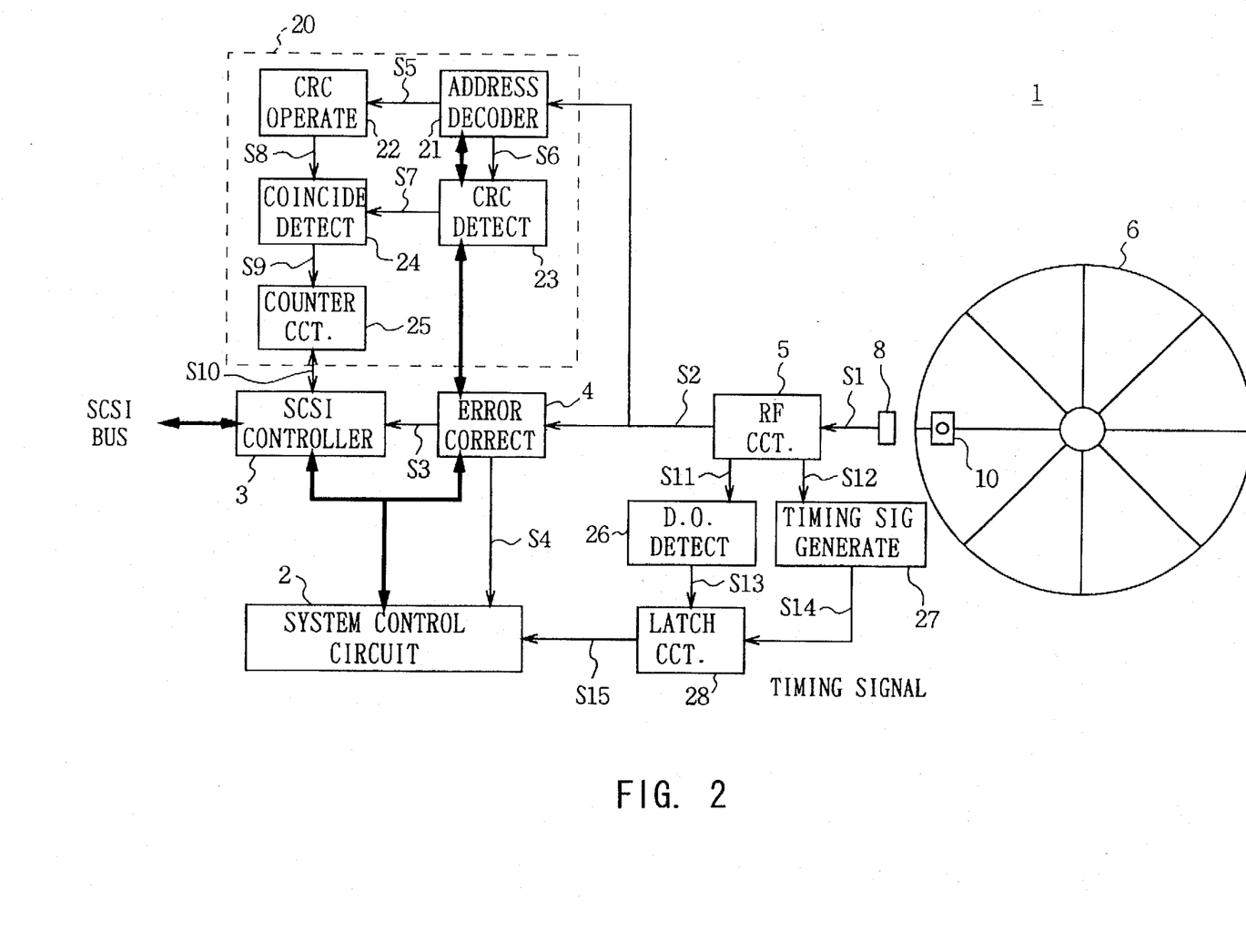
FIG. 2 is a configuration diagram illustrating the defective sector detecting system of the magneto-optical disc recording/reproducing device of an embodiment of the disc inspecting device according to the present invention.

Preferred embodiments of this invention will be described with reference to the accompanying drawings:

FIG. 1 and FIG. 2 illustrate, as a whole, a disc inspecting device such as a magneto-optical disc recording/reproducing device 1. In this invention, at the time of discrimination of defect sectors, it detects whether a high-frequency signal is missed or not, in addition to detection by the use of a conventional defect sector detecting system.

As shown in FIG. 1, the magneto-optical disc recording/reproducing device 1 is controlled on the inside by a system control circuit 2. The magneto-optical disc recording/reproducing device 1 inputs from and outputs data to external devices, via a SCSI controller 3 which is an interface circuit.

First, at the time of data recording, the SCSI controller 3 gives data received from a SCSI bus to a data error correcting means such as an error correcting circuit 4 so as to add an error correcting code to the data, and then gives the resultant data to a high-frequency signal (shown by RF, in the figure.) circuit 5. The high-frequency signal circuit 5 forms the data which have been matched to the characteristics of the recording/reproducing system, for efficient recording on a disc recording medium such as a magneto-optical disc 6, and gives the data to a laser power control circuit 7 as a recording data.

The laser power control circuit 7 gives a driving signal to a optical-head fixed portion 8 to drive a laser diode 9 in the optical-head fixed portion 8, and records the recording data onto the magneto-optical disc 6 via the optical system of the optical-head fixed portion 8 and a optical-head movable portion 10.

In addition, in the optical-head fixed portion 8, the high-frequency signal is superimposed on the driving signal at the time of recording with a high-frequency superimposing circuit 13, and drives the laser diode 9.

Next, at the time of data reproduction, the output laser of the laser diode 9 is irradiated to the magneto-optical disc 6, and the reflected light is supplied to a photo detector 11. A preamplifier 12 amplifies the output of the photo detector 11, and sends the amplified data signal S1 to the high-frequency signal circuit 5. The high-frequency signal circuit 5 decodes the output of the preamplifier 12 and supplies the data S2 to the error correcting circuit 4. The error correcting circuit 4 corrects the data error and outputs the original data which have been recovered to the exterior via the SCSI controller circuit 3.

In addition, in the magneto-optical disc recording/reproducing device 1, at the time of data recording and reproducing, the output laser of the laser diode is focused on the magneto-optical disc 6 by a focus servo circuit 16 and a tracking servo circuit 17, and an actuator of a lens which is included in the optical-head movable portion 10 is controlled so that the focused output laser exactly scans the track on the magneto-optical disc 6. Also, a disc servo circuit 18 controls the rotation of the magneto-optical disc 6 and a radial servo circuit 19 controls the position of the entire optical-head movable portion 10 in the radial direction of the magneto-optical disc 6.

In addition, in the focus servo circuit 16 and the tracking servo circuit 17, when the instant change of servo error is larger than the reference value, it is considered that there is a defect on the magneto-optical disc 6 and the servo error flag is output to the system control circuit 2.

In the magneto-optical disc recording/reproducing device 1 described above, the magneto-optical disc 6 is inspected concerning the following matters: 1) whether or not any data error occurs over the error correcting ability which has been set; 2) whether or not the set number or more of the signals which has been recorded several times in the address part can be read out; 3) whether or not the servo error signal reaches to the fixed value or more; 4) whether or not the fixed number or more of the reproduction synchronizing signals of the data part can be detected; and 5) whether or not the reproduction synchronizing signals have been missed.

The magneto-optical disc recording/reproducing device 1 discriminates defect sectors on the basis of the result of the above inspection, and then stores them in the system control circuit 2. The magneto-optical disc recording/reproducing device 1 records the position information of the defect sectors which have been found at the time of inspection in the defect management area on the magneto-optical disc 6, and performs recording and reproducing, avoiding these defect sectors, at the time of actual use.

Figure 6:
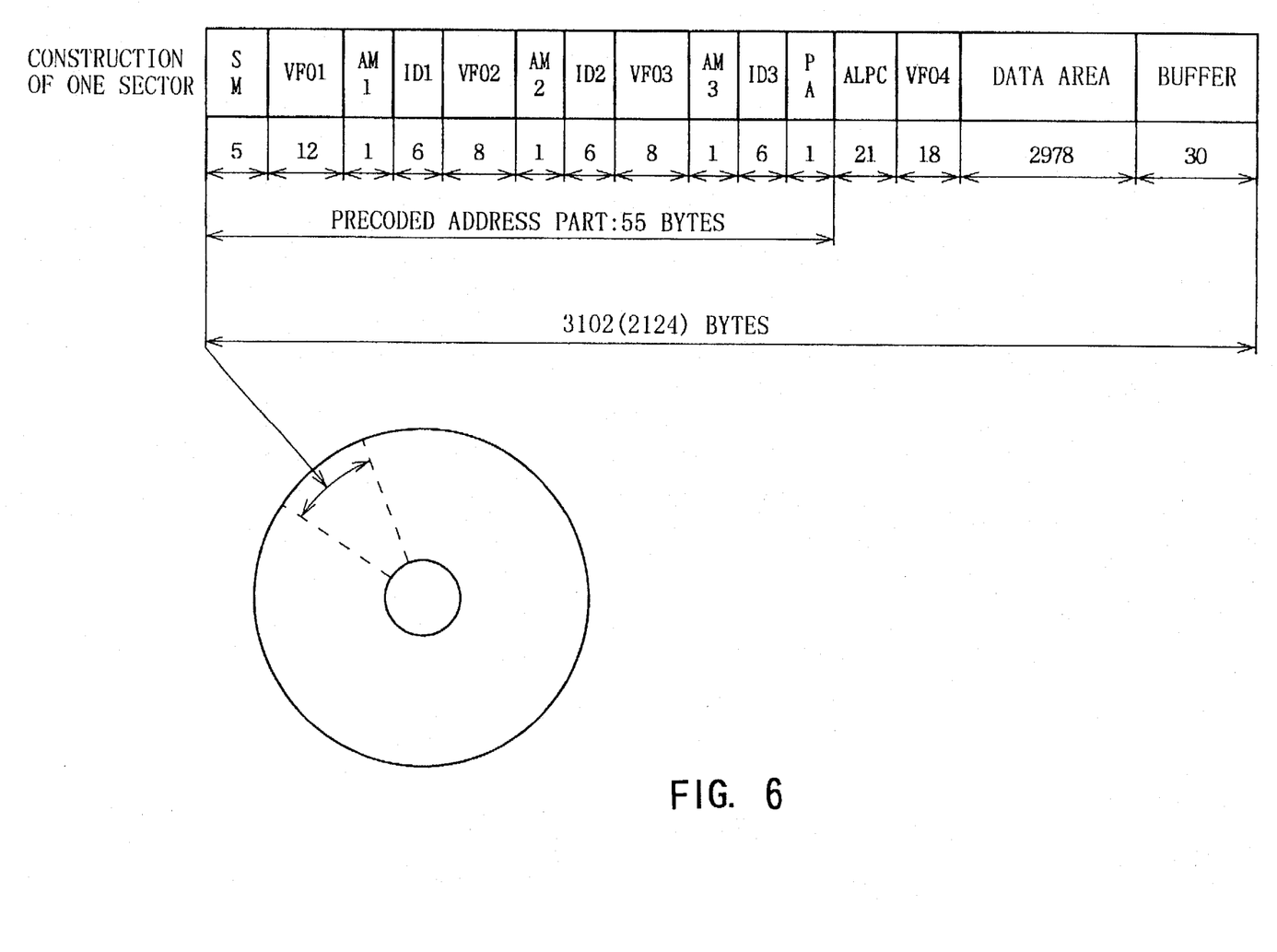
FIG. 6 is a schematic diagram showing the record format on the disc.

Here, the recording format according to the magneto-optical disc recording/reproducing device 1 will be described. FIG. 6 shows an example of format of recording by the magneto-optical disc recording/reproducing device 1. The spirally-formed continuous recording track is provided on the magneto-optical disc 6. The recording track has been divided into sectors which are respectively recording areas for fixed quantity of record data, for instance, 3,102 bytes. On the head of respective sectors, a precoded address part, e.g. of 55 bytes has been provided. In the address part, address information which is required for data accessing has been previously recorded.

The address information is comprised of a sector mark, reference signals, address mark signals, identification signals, and a postamble signal (in the figure, designated as SM, VFO, AM, ID and PA, respectively). In order to enhance reliability, the reference signal, the address mark signal, and the identification signal are respectively recorded three times.

The sector mark shows that the address part starts here. The reference signal causes the PLL circuit to produce a clock which is needed at the time of signal detection. The address mark signal shows the start of the identification signal. The identification signal is comprised of a track number and a sector number, an identification number which shows what numbers identification signal is it, and a CRC signal. The postamble signal shows the end of the address part.

The magneto-optical disc recording/reproducing device 1 discriminates the respective sectors based on the track numbers and the sector numbers and accesses them, and then judges whether the reproduced track numbers and sector numbers are correct or not, based on the CRC signal.

FIG. 2 shows the configuration of the circuit for detecting a defect based on the reproduced data signal S1. When the error correcting circuit 4 can not recover the original data S3 from the reproduced data S2, the magneto-optical disc recording/reproducing device 1 gives error flag data S4 to the system control circuit 2 from the error correcting circuit 4, and causes the circuit 2 to store them as the defect sectors. The magneto-optical disc recording/reproducing device 1 gives the reproduced data S2 which have been output from the high-frequency signal circuit 5 to address data detecting means, such as, an address data detecting circuit 20, and inspects the signal of the address part.

The address data detecting circuit 20 decodes the data of the address part of the sector by means of an address decoder 21, gives the decoded data S5 to an error detecting redundancy code check signal (hereinafter, referred to as CRC (cyclic redundancy check)) operating circuit 22, and causes the circuit 22 to perform CRC operation. Besides, the address data detecting circuit 20 gives the decoded data S6 to a CRC detecting circuit 23, and causes the circuit 23 to recover a CRC data S7. The address data detecting circuit 20 gives the data S8 which have been operated by the CRC operating circuit 22 and the CRC data S7 which have been recovered by the CRC detecting circuit 23 to a coincidence detecting circuit 24, and causes the circuit 24 to compare them.

The address data detecting circuit 20 gives the data S9 which have been detected by the coincidence detecting circuit 24 to a counter circuit 25, and causes the circuit 25 to count the number of the CRC data S7 which have been correctly recovered. The magneto-optical disc recording/reproducing device 1 gives the numerical data S10 which have been counted by the counter circuit 25 to the system control circuit 2, and causes the circuit 2 to judge whether a defect exists or not.

Further, the output S11 and the output S12 of the high-frequency signal circuit 5 are respectively supplied to high-frequency signal drop-out detecting means, such as, a drop-out detecting circuit 26 and a timing signal generating circuit 27. In the case where the reproduced high-frequency signal has been missed at the position which is corresponding to the resynchronizing signal in the record data shown in, for instance, FIGS. 3A to 3C, the drop-out detecting circuit 26 outputs a pulse-form drop-out signal S13 to a latch circuit 28 to latch the defect information.

As shown in FIGS. 4A to 4E, in the magneto-optical disc recording/reproducing device 1, a pulse-form timing signal S14 is given to the latch circuit 28 from the timing signal generating circuit 27, whenever the data parts of the respective sectors have been ended. As shown in FIG. 2, the latch circuit 28 gives a latched output signal S15 to the system control circuit 2 till the timing signal S14 of the next sector is output from a missed position. Hereby, the magneto-optical disc recording/reproducing device 1 is able to detect a short miss too with a high efficiency, and to record it in the system control circuit 2.

Figure 5:
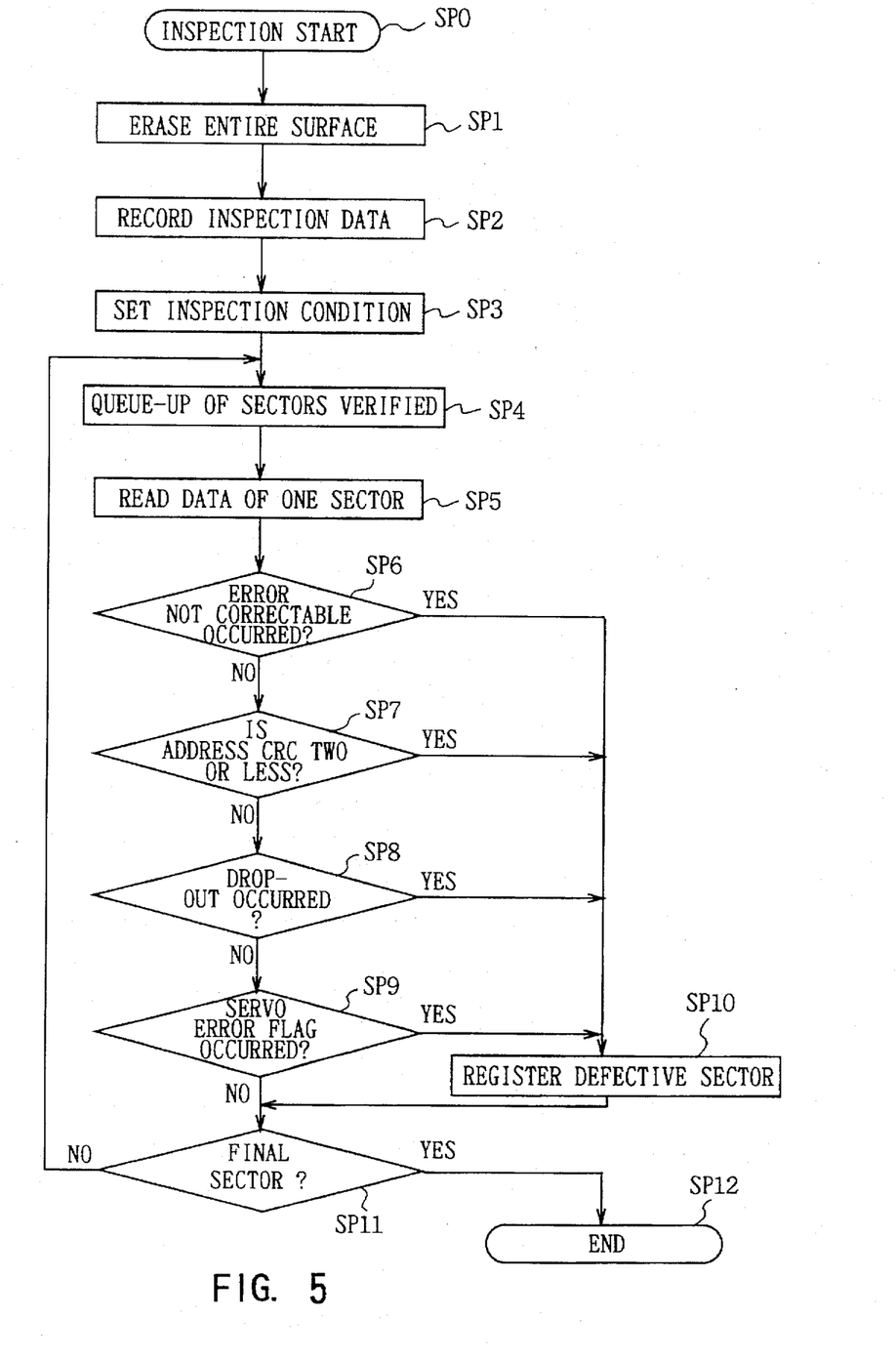
FIG. 5 is a flow chart showing the defect sector judging procedure.

FIG. 5 shows the inspection procedure of the defect sectors in the magneto-optical disc recording/reproducing device 1. That is, the magneto-optical disc recording/reproducing device 1 enters at the start step SP0, and erases the entire surface of the magneto-optical disc 6 at the step SP1, and then proceeds to step SP2.

At step SP2, the magneto-optical disc recording/reproducing device 1 records the data for inspection, and then proceeds to step SP3 to set the conditions for inspection. At this time, the magneto-optical disc recording/reproducing device 1 deviates the recording and reproducing conditions such as the power of the laser diode 9 from the usual working state, and/or sets the correcting ability of the error correcting circuit 4 lower.

The magneto-optical disc recording/reproducing device 1 then proceeds to step SP4 to set the order of verification of sectors which are the objects of verification, and then proceeds to step SP5. At step SP5, the magneto-optical disc recording/reproducing device 1 reads data of one sector, and proceeds to step SP6. At step SP6, the magneto-optical disc recording/reproducing device 1 checks if an error which can not be corrected by the error correcting circuit 4 has occurred; if a negative result is obtained, then it decides that reproduction of the original data has succeeded, and proceeds to step SP7.

At step SP7, the magneto-optical disc recording/reproducing device 1 checks if the CRC signals which have been counted by the counter circuit 25 is two or less; if a negative result is obtained, then it decides that three CRC signals have been counted, and proceeds to step SP8. At step SP8, the magneto-optical disc recording/reproducing device 1 checks if a drop-out of the high-frequency signal has occurred; if a negative result is obtained, then it decides that a drop-out of the high-frequency signal did not exist, and proceeds to step SP9.

At step SP9, the magneto-optical disc recording/reproducing device 1 judges whether the servo flag occurs or not. If a negative result is obtained, it is decided that the servo error having larger instant change does not exist and then proceeds to step SP11.

At step SP11, the magneto-optical disc recording/reproducing device 1 checks if the final sector has been verified; if a negative result is obtained, then it returns to step SP4 to repeat the abovementioned procedure.

If an affirmative result is obtained at step SP6, then the magneto-optical disc recording/reproducing device 1 decides that reproduction of the original data has not succeeded, proceeds to step SP10 to register the defect sector, and then proceeds to step SP11 to repeat the above-mentioned procedure.

If an affirmative result is obtained at step SP7, the magneto-optical disc recording/reproducing device 1 decides that three CRC signals have been not counted, proceeds to step SP10 to register the defect sector, and then proceeds to step SP11 to repeat the abovementioned procedure. In addition, if an affirmative result is obtained at the step SP8, the magneto-optical disc recording/reproducing device 1 decides that the high-frequency signal has been missed, proceeds to step SP10 to register the defect sector, and then proceeds to step SP11 to repeat the abovementioned procedure.

Further, if an affirmative result is obtained at step SP9, the magneto-optical disc recording/reproducing device 1 decides that the servo error having larger instant change exists, proceeds to step SP10 to register the defect sector, and proceeds to step SP11 to repeat the abovementioned procedure.

Some time later, when an affirmative result is obtained at step SP11, the magneto-optical disc recording/reproducing device 1 decides that verification of even the final sector has been performed, proceeds to the step SP12 to terminate the defect sector judging procedure.

According to the above construction, in addition to the verification of recorded data and the detection of the servo error having larger instant change, by detecting whether a high-frequency signal has been missed or not by means of the drop-out detecting circuit 26, it is able to detect the defect sectors of which sure detection have been heretofore difficult with a high efficiency and to previously prevent errors of the reproduced data, so as to improve the reliability of the data S3 which are reproduced from the inspected magneto-optical disc 6.

Because of improved reliability of the reproduced data S3, it is able to further increase the recording density.

In addition, because sufficient reliability can be ensured via one time inspecting operation, the time needed for checking of a high recording density magneto-optical disc 6 is diminished. Therefore, rising manufacturing cost can be suppressed.

In the above embodiment, the description has been given of the case where the magneto-optical disc 6 is inspected. However, this invention is not limited to this, but is widely applicable to an inspecting device for reproducing a high-frequency signal from a disc whose recording has been performed with an arbitrary recording system and for inspecting whether the high-frequency signal is missed or not.

While the above has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An apparatus for inspecting a disc recording medium which inspects whether or not said disc recording medium has a defect, which has recording/reproducing means for recording and reproducing data in said disc recording medium, servo means for servo-controlling said recording/reproducing means to record said data in said disc recording medium in a predetermined state, and data reproducing means for reproducing data from the output of said reproducing means, said apparatus comprising:

data error detecting means for detecting an error of data reproduced by said disc recording medium;

servo error detecting means for detecting the existence of the instant change larger than the reference value of the servo error of said servo means;

signal drop-out detecting means for detecting the drop-out of high-frequency signal reproduced from said disc recording medium;

defect detecting means for detecting the existence of the defect of said disc recording medium based on the detected result of said data error detecting means, said servo error detecting means, and said signal drop-out detecting means; and recording means for recording the defective portion of said disc recording medium in the management area of said disc recording medium in accordance with the detected result of said defect detecting means.

2. The apparatus for inspecting a disc recording medium according to claim 1, wherein said data error detecting means comprises, at least, data error correcting means for correcting errors of said reproduced data, address data detecting means for detecting an address data of said reproduced data, and synchronizing signal detecting means for detecting the synchronizing signal of said reproduced data, and said data error detecting means detects said data error based on said data error correcting means, said address data detecting means, and said synchronizing signal detecting means.

3. The apparatus for inspecting a disc recording medium according to claim 1, wherein said defect detecting means decides that said disc recording medium has a defect, when at least one of three cases occur: said data error detecting means detects error; said servo error detecting means detects servo error; and said signal drop-out detecting means detects said drop-out.

4. The apparatus for inspecting a disc recording medium according to claim 1, wherein said recording/reproducing means is optical recording/reproducing means, and said servo error detecting means detects the existence of servo error based on the error of focus servo and tracking servo of said optical recording/reproducing means.

5. The apparatus for inspecting a disc recording medium according to claim 4, wherein said disc recording medium is a magneto-optical disc recording medium.

* * * * *